`United States Patent Office`

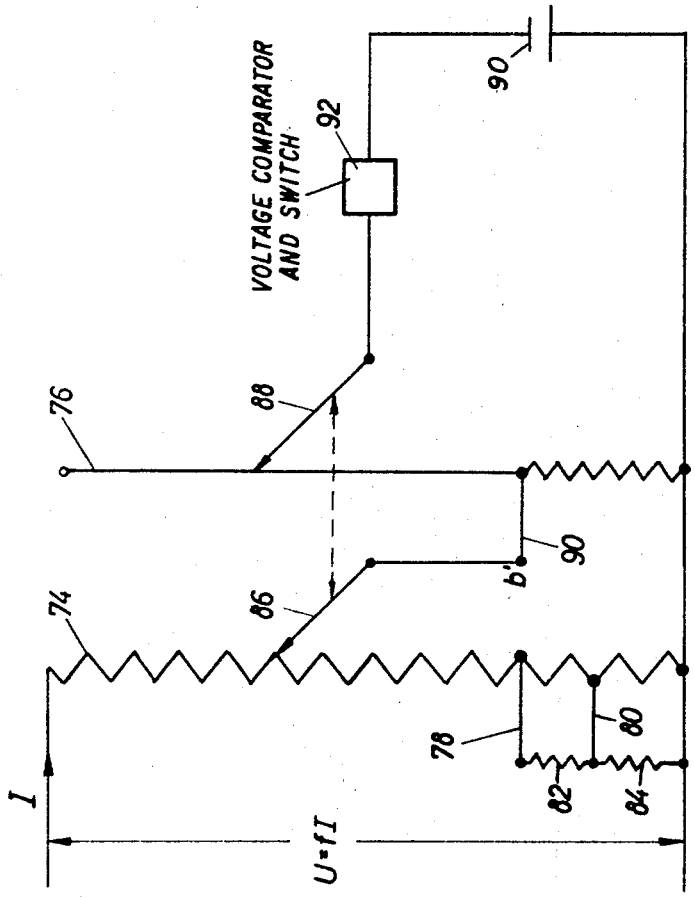
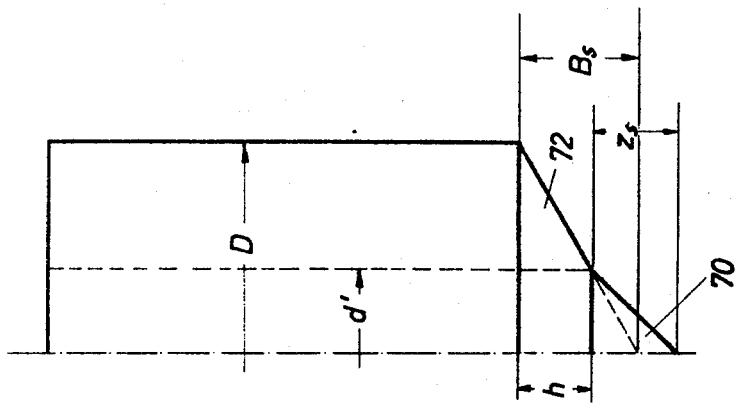

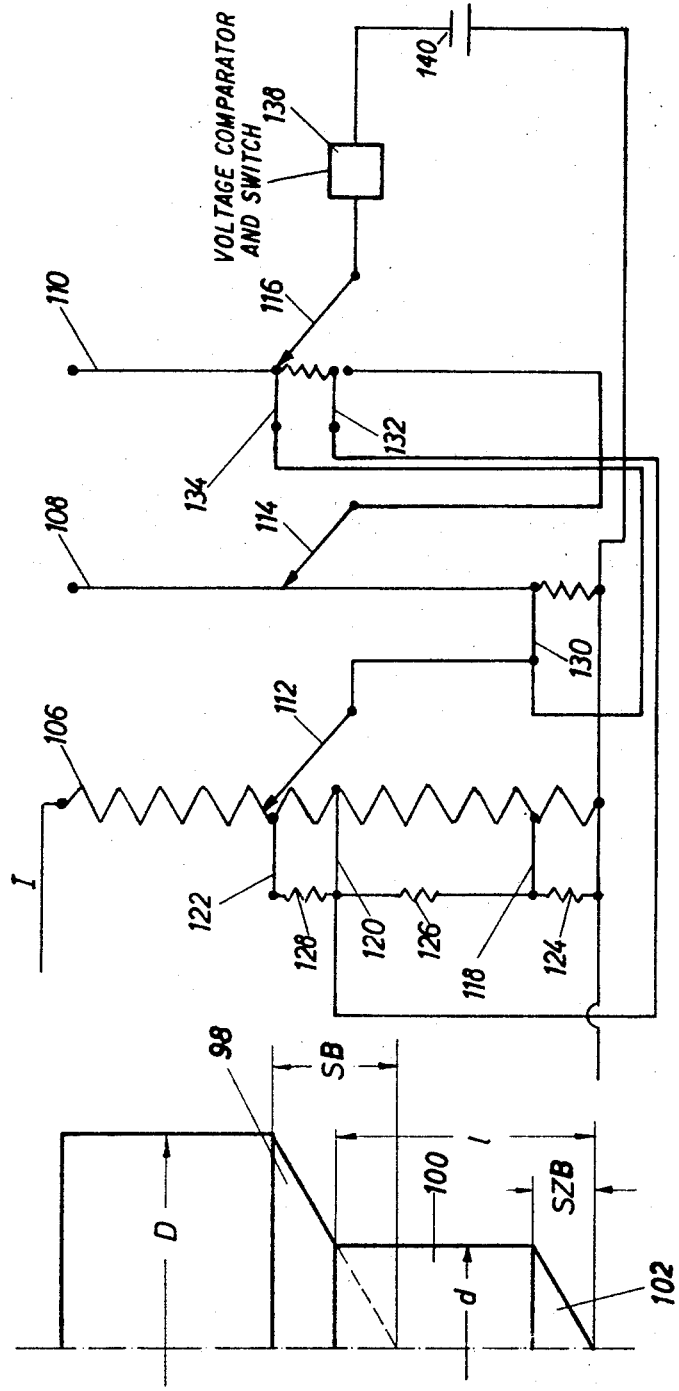

3,446,100
Patented May 27, 1969

3,446,100
DEVICE FOR AUTOMATIC CORRECTION
OF AN UNBALANCE
Hans-Ludwig Munk, Dusseldorf, Germany, assignor to
Losenhausenwerk Dusseldorfer Maschinenbau Aktiengesellschaft, Dusseldorf-Grafenberg, Germany
Filed Aug. 11, 1966, Ser. No. 571,940
Claims priority, application Germany, Aug. 12, 1965,
L 51,363
Int. Cl. B23b 47/00
U.S. Cl. 77—5          8 Claims

ABSTRACT OF THE DISCLOSURE

A potentiometer slider is connected to a cutting tool which removes material from an object for the correction of an unbalance in the object. In a portion of the potentiometer, which portion represents the initial penetration of the cutting tip of the tool into the object, the potentiometer is non-linear so that the voltage drop across that part of the potentiometer will change corresponding to the change in the amount of material removed as the cutting tip initially penetrates the object. The remainder of the potentiometer is linear. The non-linearity of the initial portion is achieved by shunting one or more other resistors, fixed or variable, across all or parts of that initial portion of the potentiometer.

---

This invention relates to a device for automatical correction of an unbalance by means of a cutting tool, preferably by drilling. A balancing machine provides a measured value for the unbalance to be balanced, which can be stored in any appropriate way. For automatic balancing of the unbalance, the amount of matter removed, which, for example, is represented by the depth of the drill hole, is continuously compared with the measured value stored. The balancing process is finished, when the quantity of matter removed is equal to the measured value stored. Various devices of this kind are well known.

In prior art devices, the automatic correction is effected by making the tap of a potentiometer adjustable in proportion to the advancement of the tool and by controlling the balancing process by the difference of the voltage tapped from the potentiometer and an unbalance measuring voltage. In this device, the depth of the drill hole is translated into a proportional voltage by means of the potentiometer, and this voltage is compared with an unbalance measured value stored as a voltage. As soon as the voltage from the potentiometer tap increasing with the depth of the drill hole becomes equal to the unbalance measured voltage, the correcting process is stopped and the drill is retracted. Errors occur, however, due to the fact that usually the drill has a conical bit and, therefore, at first, removes less material than the depth of the drill hole indicates.

Furthermore, a device is wll known wherein the unbalance measured value is stored digitally in a counter and an impulse generator is coupled with the drill. Thus impulse generator transmits impulses to the counter in proportion to the advancement of the drill. These impulses are subtracted from the unbalance measured value stored, and as soon as the counter has been returned to zero, the correcting process is stopped. In this prior art device, attempts have been made to take the drill bit into consideration. For this purpose, provision is made that the drill upon touching the unbalance body, makes at first a certain small stroke relation to the drill head, while the drill bit already cuts into the unbalance body. Then the impulse generator is only switched on after this initial stroke has been carried out. Thus the generation of the impulses is somewhat delayed mechanically, in order to take into consideration the smaller removal of the conical drill bit. This device is relatively complex, and it will be understood that accuracy is limited notwithstanding the high demands on the precision of the balancing device. In particular it should be practically impossible to adapt the prior art device to the various shapes of the tool and the drill diameters. It has also, already been tried to weigh the material drilled out, in order to determine in this way, when the correction should be stopped. This method has not led, however, to any useful result.

An object of the invention is to avoid the disadvantages of the prior art devices described and to provide an analogly operating correction device which permits taking into consideration various drill bits or other shapes of the tool. The invention provides an automatic unbalance correction device wherein the tap of a potentiometer is adjustable in proportion to the advancement of the tool, and wherein the correcting process is controlled by the difference of the voltage tapped from the potentiometer and an unbalance measuring voltage, and is characterized by the use of a function potentiometer adapted to the characteristics of the tool.

By appropriate choice of the function impressed to the function potentiometer, provision can be made that, even though the movement of the potentiometer tap is proportional to the tool advancement, the voltage picked-off from the tap and compared with the measured unbalance voltage is not changed proportional to the tool advancement but proportional to the amount of matter removed. If, for example, the tool is a drill having a conical bit, the initial portion of the drill advancement up to the depth of the bit will produce only one third of that voltage, on the tap of the potentiometer, which the corresponding advancement produces during the further movement of the drill into the work.

Function potentiometers having a desired characteristic can be produced in various ways. For the invention it is advantageous for many applications, if resistors are provided to be connected in parallel to portions of a linear potentiometer to adapt it to the characteristic of the tool. If, for example, the resistance connected in parallel is half the resistance of that portion of the potentiometer to which it is connected in parallel, the voltage drop across this portion of the potentiometer is only one third of the voltage drop across the same length in the remaining portions of the potentiometer. This would, for example, take into account the fact that a conical drill bit removes only one third of the volume of material as does a cylindrical drill of the same cross section as the base of the cone and with the same depth of boring. By such a shunt connection of resistors, the drill bit or the like can be taken into account as a whole, that is to say the correct voltage is obtained on the potentiometer tap as long as the depth of the drill hole is larger than the height of the drill bit. For optional application of different drills, optionally different resistors may be shunt connected to different portions of the potentiometer.

In order that, on the remaining portion of the potentiometer which corresponds substantially to the cylindrical portion of the drill, equal voltage increments correspond to equal paths, regardless of which resistors are shunt connected to a portion of the potentiometer to take into consideration a specific kind of drill bit, means can be provided for keeping the total flow of current through potentiometer and shunt resistors always constant. Of course, it is also possible, to provide instead an appropriate attenuation of the unbalance measured voltage. The latter procedure also can be used to obtain an adaptation to different drill diameters.

The means for keeping the current constant can include means for inserting an appropriate series resistor for the potentiometer, simultaneously with the shunt connection of a resistor on the potentiometer, so as to keep the total current constant.

The measures described permit making corrections where the depth of the drill hole is larger than the height of the conical drill bit. However, they do not provide for the small corrections required when only a part of the drill bit penetrates into the unbalance body. In this range, the amount of material drilled out increases proportional to the square of the depth of the drill hole and simply shunt connecting a resistor will, therefore, not do in this case. To provide correction for the range up to the depth of the drill bit the slider of a second linear potentiometer is mechanically coupled with the slider of the first linear potentiometer, with the resistance of the second potentiometer being large as compared with that of the first potentiometer. A fixed tap of the second potentiometer is electrically connected with the slider of the first potentiometer, and an output voltage is picked-off from the slider of the second potentiometer.

As long as the slider of the second potentiometer is above or outside the said fixed tap, it will be at the potential of the slider of the first potentiometer. The voltage picked off is changed linearly with the path of adjustment. The drill bit can be taken into account as a whole, for example (as previously described) by a shunt resistor across the lower portion of the first potentiometer. When, however, the sliders of the potentiometers get into the range below the tap mentioned of the second potentiometer, the voltage picked off from the tap of the second potentiometer will change in accordance with the quadratic characteristic. First, the partial voltage picked off from the first potentiometer and applied to the tap of the second potentiometer increases linearly with the depth of the drill hole. Secondly a portion increasing linearly with the depth of the drill hole is picked off from the second potentiometer.

While herein the terms "drill," "drill bit" and "depth of drill hole" are used for simplicity, it will be understood that the above explanations are similarly valid also for other cutting tools. The term "bit," as used herein, refers to the cutting portion of the tool rather than a particular tool as a whole.

By the arrangement described it also becomes possible to correct automatically smallest unbalances lying within the range of the drill bit, and thereby to increase substantially the accuracy of automatic balancing processes. Most accurate balancing, up to now, had to be carried out manually. It was effected more or less by trial and error, with the operator, more or less empirically taking into consideration the effect of the tool profile on the basis of his experience.

Some embodiments of the invention are shown in the drawings and are described hereinbelow:

FIG. 9 shows an alternative embodiment for use with a tool as illustrated in FIG. 9a.

FIG. 9a illustrates a tool (drill) having a double taper on the bit.

FIG. 10 illustrates an alternative embodiment for use with a tool as illustrated in FIG. 10a.

FIG. 10a illustrates a drill having a centering bit.

Figure 1:
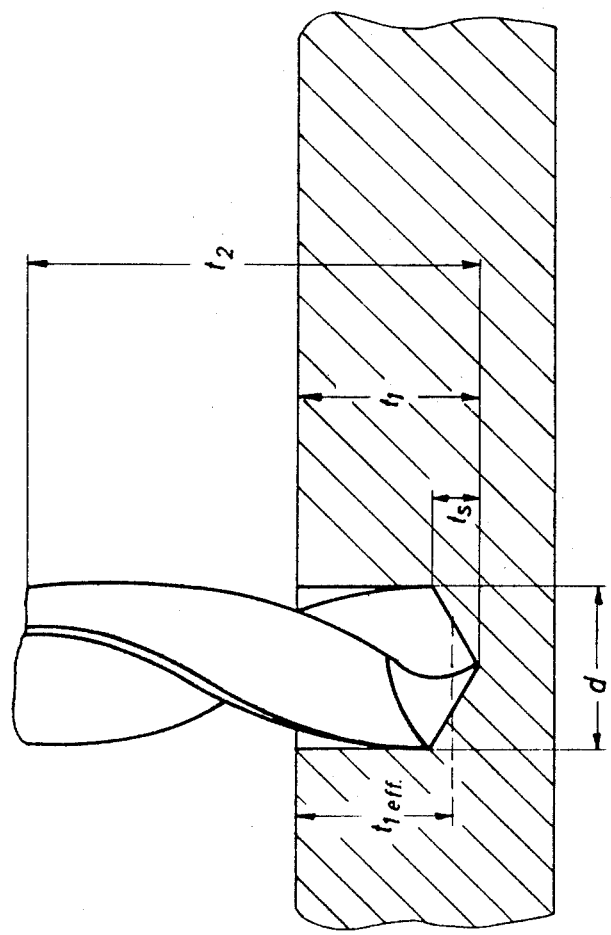
FIG. 1 shows a drill in an unbalance body shown in section, and serves for the explanation of the various designations uses herein.

FIGURE 1 illustrates the designations used hereinbelow in the formulas. $t_1$ designates the depth of the drill hole, $f_2$ is the maximum possible depth of drill holes. The height of the drill bit is designated $t_s$. The specific weight of the material to be drilled out is designated $\gamma$; $m$ designates the mass to be corrected, and $d$ is the diameter of the drill. The depth of the drill hole required for the correction for an unbalance mass $m$ taking into account the conical drill bit is $$t_1 = t_s + \frac{m - \frac{\frac{d^2}{4} \cdot t_2 \cdot \gamma}{3}}{\gamma \cdot \frac{d^2}{4}}$$

With $t_{1\text{ eff}}$ designating the depth of the drill hole which a purely cylindrical drill (without conical bit) had to reach, in order to correct for a mass $m$ $$t_{1\text{ eff.}} = \frac{m}{\gamma \cdot \frac{d^2}{4}}$$

Figure 2:
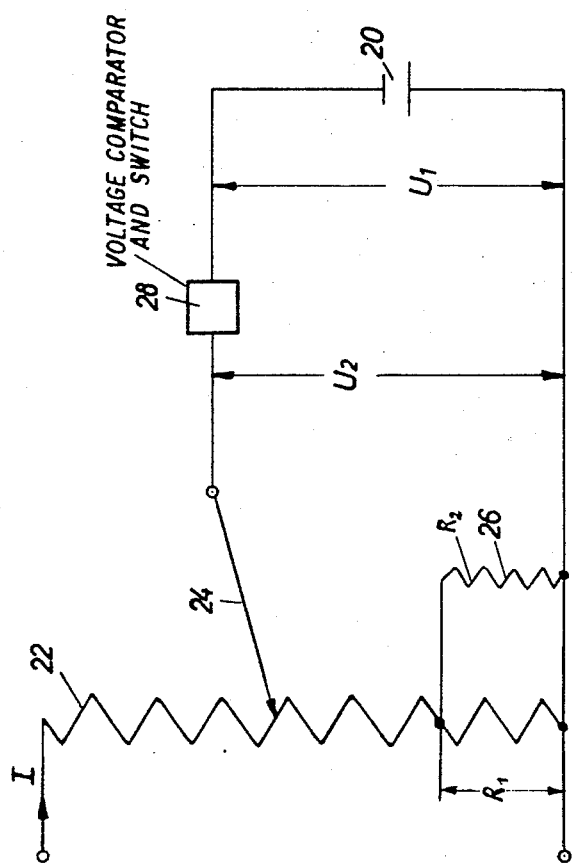
FIG. 2 shows schematically a wiring diagram according to the invention and illustrates the basic concept of the invention.

It may be assumed that the drill diameter $d$ and the specified weight $\gamma$ are already taken into account by appropriate voltage dividers in the circuit of the measured voltage, and that a memory 20 for the unbalance measured value, which is shown in FIG. 2 as a voltage source, provides a measured voltage $U_1$ representing the unbalance value reduced to $t_{1\text{ eff}}$. In FIG. 2 a circuit is shown taking into account the whole drill bit. This circuit comprises a potentiometer 22 the slider of which is, in a manner not shown, coupled with the drill advancement. When the drill has made its maximum path $t_2$, the slider 24 has been moved over the whole potentiometer. A portion $R_1$ of the potentiometer corresponding to the height of the drill bit $t_s$ (FIG. 1) is shunted by a resistor 26 ($R_2 = \frac{1}{2} R_1$). This has the result that the voltage drop across portion $R_1$ is only one third of the voltage dropping across a corresponding length in the remaining length of the potentiometer 22. This takes the fact into account that the cone of the drill bit has only one third of the volume of an equally high cylinder having the same basis. Thus a correspondingly lower voltage is picked off from the slider 24, when it is in the $R_1$ range, than would be the case with only the potentiometer 22 without the resistor 26. Therefore, the voltage $U_2$ on the slider 24 corresponds to the amount of matter actually bored out, and this is connected in opposition to the measuring voltage $U_1$ at a sensitive electronic switch 28, and the switch 28 stops the correction process as soon as $U_2 = U_1$, that is to say the required amount has been drilled out.

Figure 3:
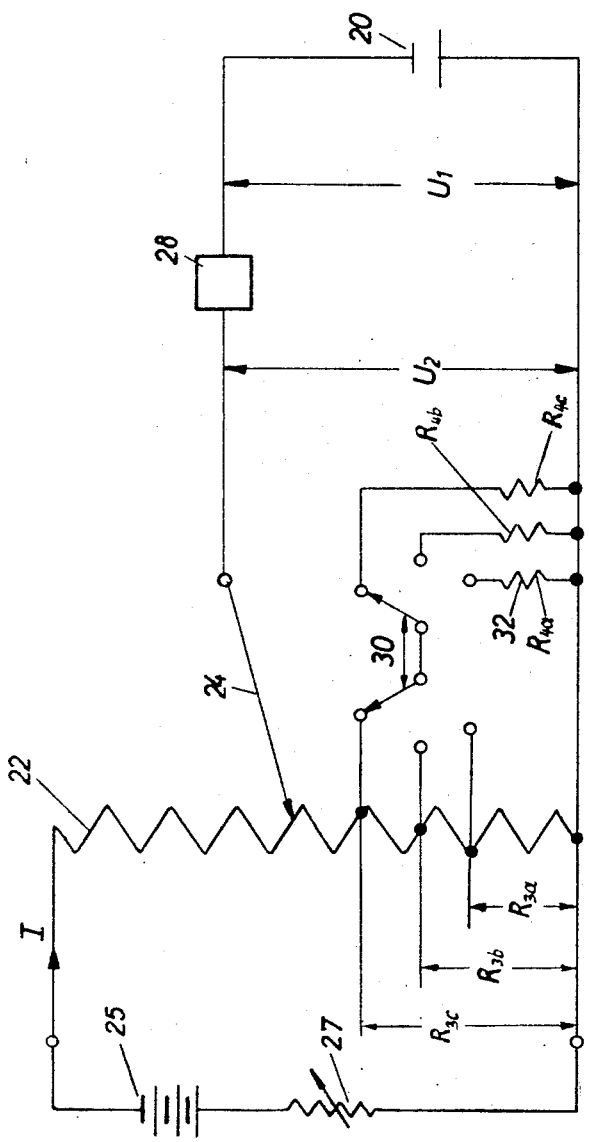
FIG. 3 shows a modification permitting an adaptation to different drill shapes.

FIG. 3 shows an arrangement which can be adapted to different conical drill bits. By means of a selector switch 30, one out of three resistors 32 of the resistances $R_{4a}$, $R_{4b}$ or $R_{4c}$ can optionally be shunted to the potentiometer portions $R_{3a}$, $R_{3b}$ or $R_{3c}$, respectively. Again $R_{3a} = 2R_{4a}$, $R_{3b} = 2R_{4b}$ and $R_{3c} = 2R_{4c}$. Thereby different heights $t_s$ of the drill bit may be taken into account. Thus the device may be adapted to different drill bit angles with constant drill diameter $d$ or, with given drill bit angle, to different drill diameters. In practice, of course, more than three taps and shunt resistors (32) will be provided. Preferably, a multiturn potentiometer is used, in order to be able to provide a large number of and very closely spaced taps. The source for electrical current in FIG. 3 is represented by battery 25. A variable resistor 27 is connected in series with battery 25 and the potentiometer so that a constant current I may be maintained through the unshunted portion of the potentiometer when switches 30 are changed.

Beyond this, the operation of the device of FIG. 3 is the same as that of FIG. 2, and the same reference numerals have been used in FIG. 3 for corresponding elements as in FIG. 2.

Figure 4:
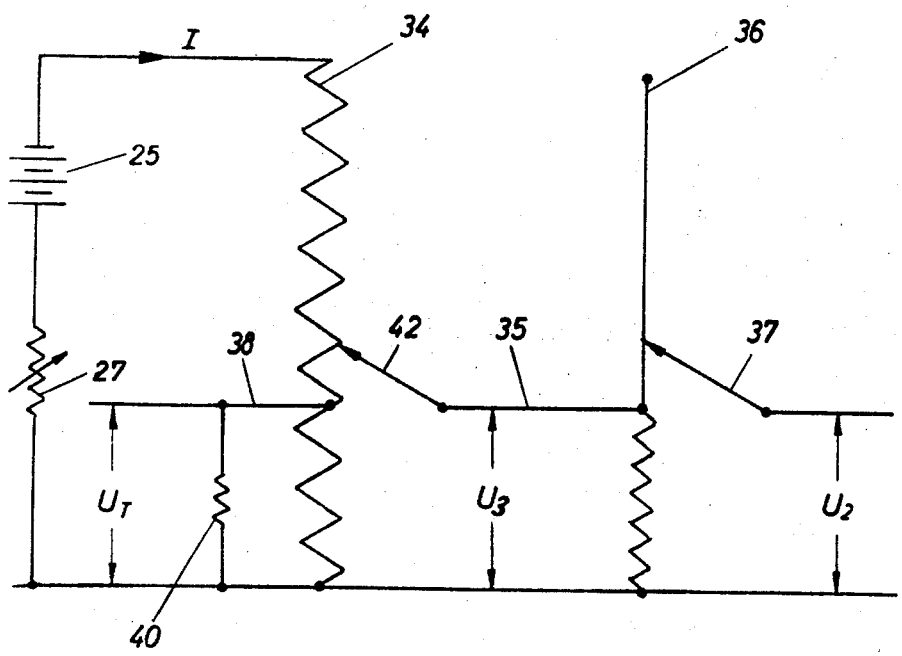
FIG. 4 shows a preferred embodiment of the invention permitting the correction also of small unbalances.

FIG. 4 shows an arrangement which also permits the correction of unbalances which are so small that only the bit of the drill becomes effective during their correction. In an arrangement according to FIG. 2 or 3, the voltage $U_2$ picked off from the slider 24 is correctly a measure for the amount of matter drilled out only if the slider is in the upper region, as shown in the drawing, of the potentiometer 22, across which region neither the resistors 26 nor resistors 32 are shunted. In this upper region the drill bit is taken into account as a whole. In the lower portions of the potentiometer 22, which lower portions are shunted by resistors $R_2$ or $R_{4a}$ through $R_{4c}$, respectively, as shown in the drawing, the voltage $U_2$ does not represent the amount of material drilled out. In this lower range, the amount of matter drilled out increases quadratically with the depth of the drill hole, whereas $U_2$ depends linearly on the position of the slider. It should, therefore, be tried to impress on the potentiometer such a quadratic characteristic, and this is achieved by the arrangement of FIG. 4.

The circuit of FIG. 4 comprises two potentiometers 34 and 36. The resistance of potentiometer 36 is large as compared with the resistance of potentiometer 34 so that the latter is scarcely loaded by the resistance of potentiometer 36. The potentiometer 34 has a tap 38, and a resistor 40 is shunt connected to the lower portion of the potentiometer 34 through this tap. The resistance of resistor 40 is half the resistance of the said lower portion of potentiometer 34. The slider 42 of potentiometer 34 is connected to a tap 35 of potentiometer 36. The slider 37 of potentiometer 36 is mechanically coupled with the slider 42 of potentiometer 34. A controlled constant current I flows through the potentiometer 34. The voltage $U_2$ from slider 37 is compared in the manner shown in FIG. 3 as a measure for the amount of matter removed, with the unbalance measured voltage $U_1$.

As long as the sliders 42 and 37 are above the taps 38 and 35, respectively, the slider 37 is at the potential of the slider 42 (i.e. $U_2=U_3$). The voltage picked off changes linearly with the path of the sliders. The effect of the whole drill bit is taken into consideration, in this range, by the shunt resistor 40.

In the range below the taps 35 and 38, the voltage $U_2$ on slider 37 is determined by two factors:

(1) From the slider 42, a voltage is picked off which is a partial voltage of the voltage applied at tap 38 and increases proportional to the depth of the drill hole.
(2) From the slider 37, a voltage $U_3$ is picked off, which again is a partial voltage of the voltage picked off from slider 42 and again increases with the depth of the drill hole.

Thus the total voltage picked off from slider 37 increases quadratically with the depth of the drill hole towards a value reached at 35 and 38 and corresponding to the total volume of the drill bit. Thus, as desired, a quadratic characteristic is obtained adapted to the characteristic of the drill. Thereby it also becomes possible to correct quantitatively for those unbalances which are so small that they can be corrected with the drill bit only. Thereby it becomes possible to considerably increase the accuracy of the automatic unbalance correction, and also to automatically remove small residual unbalances.

Up to now, circuits have been discussed which could be adapted to different diameters and bit angles of drills having simply a conical bit. If $V_s$ designates the volume of the bit and $V_z$ designates the volume of a cylinder having the same base and height, a form factor F may be defined:

$$F=V_s/V_z$$

Figure 11:
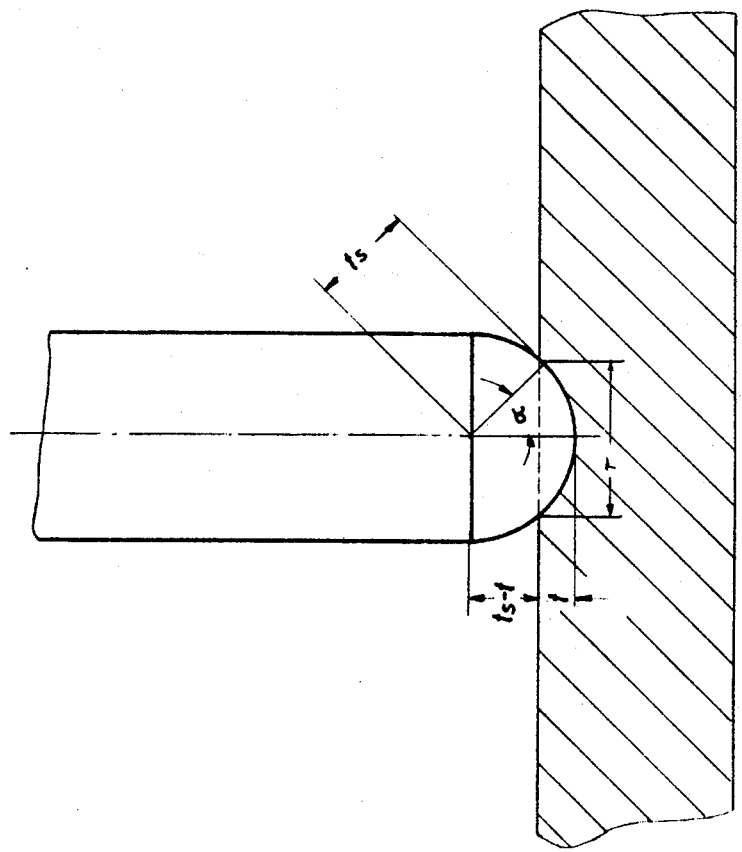
FIG. 11 illustrates the condition with a drill having a hemispherical end.

For a simply conical bit, this form factor is $F=\frac{1}{3}$. Now also other forms of the drill tip may occur. Similar conditions exist in the case of milling cutters or grinding wheels. If the form factor becomes $F>\frac{1}{3}$, there is a convex form of the tip. In FIG. 2 or 3, $R_{4a}$ would be larger than $\frac{1}{2}R_{3a}$ and so on. For concave forms of the tip, form factors $F<\frac{1}{3}$ are obtained. The various form factors can be taken into consideration as a whole by appropriate selection of the parallel resistors. As an example therefor, a tool having a hemispherical tip as shown in FIG. 11 be considered. For taking the tool bit into account by a circuit of FIG. 2 or 3, the form factor F has to be computed. If $t_s$ (see FIG. 11) is the radius of the drill and hemisphere, the ratio of the volume $V_s$ of the hemisphere to the volume $V_z$ of an equally high cylinder of the same base is $$F=\frac{1}{2}\frac{4\pi}{3}t_s^3:\pi t_s^3=\frac{2}{3}:1$$

It will be noted that a spherical tool bit can be taken into consideration as a whole, if $R_2$ is made $2R_1$ or $R_{4a}=2R_{3a}$ and so on.

Figure 5:
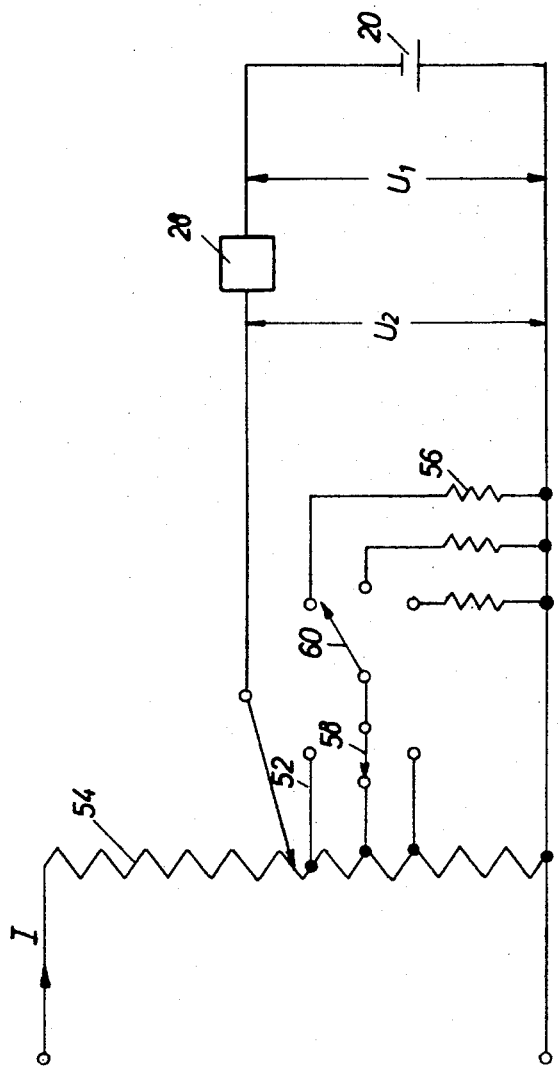
FIG. 5 shows a further embodiment of the invention permitting the optional taking into account of a plurality of fixed shapes of the tool bit.

FIG. 5 shows an arrangement, wherein optionally one out of a plurality of shunt resistors 56 can be connected to any one of a plurality of taps 52 of a linear potentiometer 54, in order to take into consideration various form factors, thus various geometrical forms of the tool bit. Then an appropriate form factor may be set for each drill bit height step by step by selection of an appropriate shunt resistor.

For this purpose, a first switch 58 is provided, the movable contact of which can optionally be connected with any one of the taps 52. The movable contact of the switch 58 is electrically connected to the movable contact of a switch 60, by which any one of an array of different potentiometer resistors 56 can be selected to be connected in circuit. The remainder of the circuit may be the same as in FIG. 3. Instead of a plurality of selectable fixed resistors 56, also a continuously adjustable resistor 62 may be provided, as shown in FIG. 6.

Figure 6:
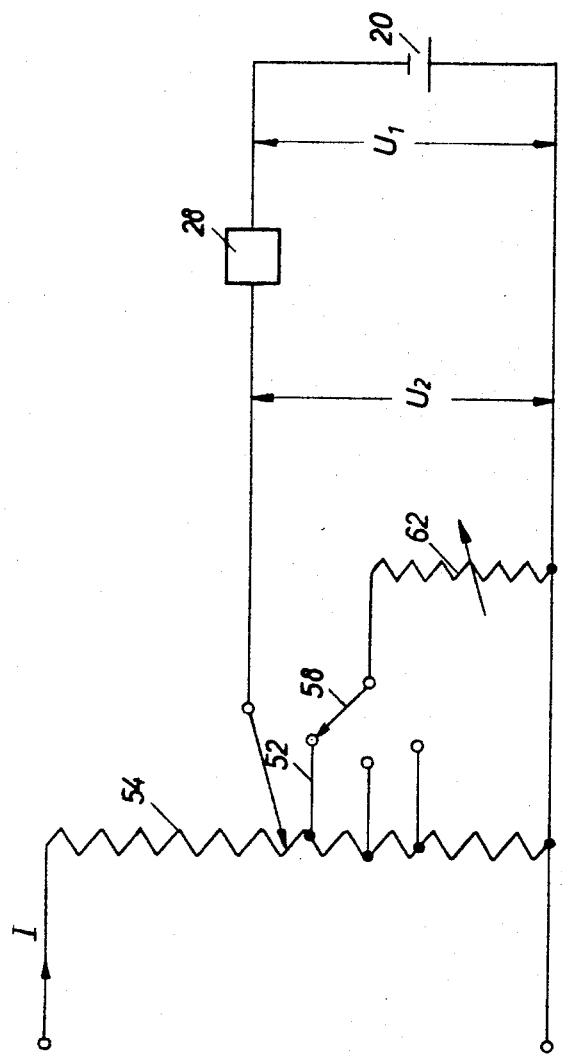
FIG. 6 shows an arrangement wherein a shunt resistor is continuously adjustable to take into account any kind of tool bit.

With the circuit of FIGS. 5 and 6 various form factors, for example hemisphere, cone and so one, may be taken into consideration for different heights $t_s$ of the drill bit.

Figure 7:
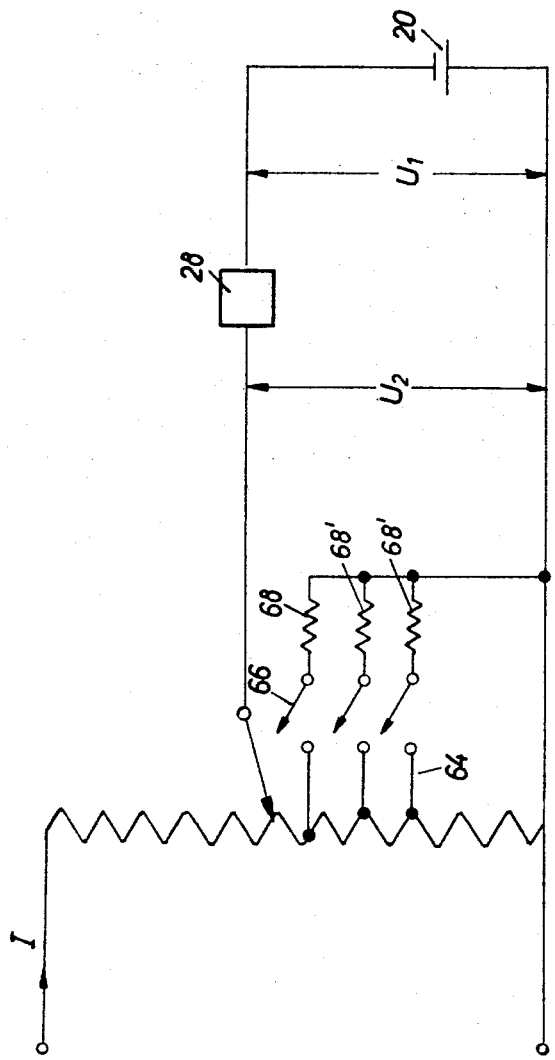
FIGS. 7 and 8 show arrangements permitting the taking into account of stepped tool bits.
Figure 8:
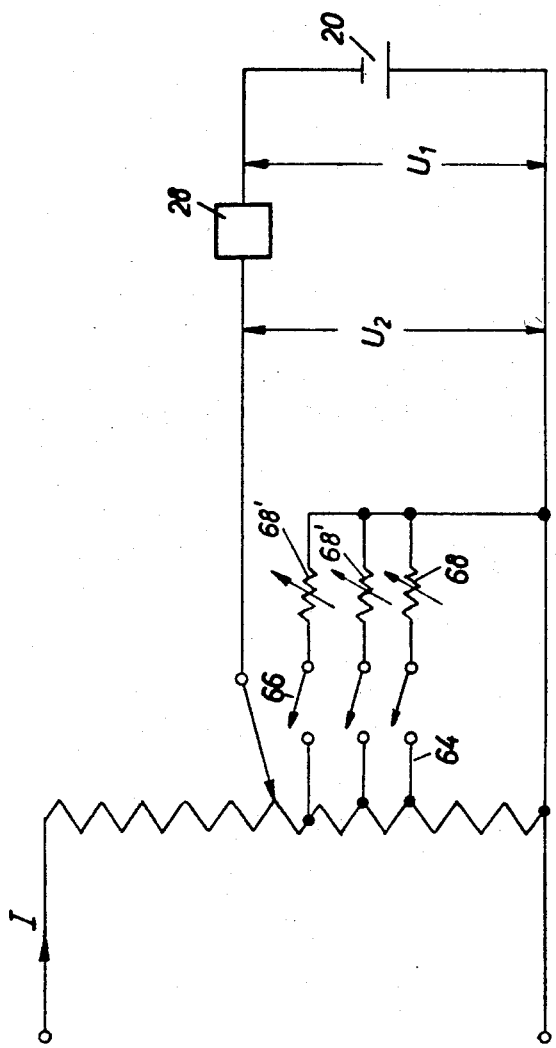

It can happen that tools do not have a simple bit but some kind of stepped profile as, for example, shown in FIG. 9a and FIG. 10a. For taking such profiles into consideration as a whole, a circuit of the type shown in FIG. 7 or FIG. 8 may be used. In these circuits, a plurality of appropriately dimensioned shunt resistors 68 or 68' can be connected simultaneously to a plurality of taps 64 through switches 66. In FIG. 7 these are fixed resistors 68, in FIG. 8 the resistors 68' are adjustable for any desired tool profile.

All last mentioned embodiments permit the taking into consideration of the tool bits as a whole. A voltage correctly proportional to the amount of matter removed taking into consideration the tool bits or tips is picked off from the potentiometer sliders, as long as the slider is in the range above the taps of the potentiometer, thus in that range of the potentiometer to which no resistor is shunt connected.

FIG. 9 shows an arrangement, wherein similar to FIG. 4 the voltage picked-off is an exact measure for the amount of matter drilled out, also in the range of the drill bit itself, thus down to smallest depths $t_s$ of the drill hole. The arrangement of FIG. 9 is intended for a drill having a profile as shown in FIG. 9a. This profile has a centering strip 70 of the height $Z_s$ and of small cone angle, which is superimposed to the actual drill bit 72, which is a little more flattened and has the height $B_s$. The base of the centering tip cone has a diameter $d'$, whereas the drill diameter is D. The height of the frustro-cone forming the drill bit proper is $h$.

The circuit of FIG. 9 taking into consideration such a form of the drill, comprises two potentiometers 74 and 76. The potentiometer 74 has a resistance $R_{74}$ and through it flows a constant current I. It has two taps 78, 80 the distance between which corresponds to the height $h$ of the frustrocone 72. A fixed resistor 82 of the resistance $R_{82}$ is connected across the two taps 78 and 80. A further fixed resistor 84 of the resistance $R_{84}$ is connected across the tap 80 and the lower end of the potentiometer, the distance between which corresponds to the height $Z_s$. The sliders 86 and 88 of the potentiometers 74 and 76 are coupled with each other. The potentiometer 76 has a tap 90 corresponding to the upper edge of the drill tip 72 and on the same height as tap 78. The resistance of the potentiometer 76 is large as compared with that of the potentiometer 74. The voltage picked off from the slider 88 is again connected in opposition to the measured voltage stored in a memory 94 at a sensitive electronic switch 92.

The arrangement described operates as follows:

If the sliders 86, 88 are above the taps 78 and 90, the slider 88 will be on the same potential as the slider 86. The drill bit including the centering tip 70 is taken into consideration as a whole by shunt connection of the resistors 82 and 84. This has the result that a smaller voltage drops across the lower portion of the potentiometer than the voltage drop across a corresponding length in the upper portion of the potentiometer. It is $$\frac{R_{84} \cdot R(80)}{R_{84} + R(80)} : R(80) = \frac{1}{3} \frac{d'^2}{D^2}$$

thus $$R_{84} = \frac{d'^2}{3D^2 - d'^2} R(80)$$

if $R(80)$ is the resistance of the lower portion of the potentiometer 74 up to the tap 80. If in similar manner $R(80-78)$ designates the resistance of the potentiometer portion between the taps 80 and 78, so is $$\frac{R_{82} \cdot R(80-78)}{R_{82} + R(80-78)} : R(80-78) = \frac{\frac{\pi h}{12}(d^2 + dD + D^2)}{D^2 \frac{\pi}{4}}$$

$$R_{82} = \frac{d^2 + dD + D^2}{\frac{3D^2}{h} - (d^2 + dD + D^2)} \cdot R(80-78)$$

Below the taps 78 and 90, that is to say in the range of the drill bits 72, 70 the voltage will change in accordance with a quadratic characteristic. In similar manner as in the arrangement of FIG. 4, the voltage on the slider 88 is determined by two factors, each of which depends on the depth of the drill hole, namely, (1) by the voltage picked off from the voltage divider 86 and, (2) by the partial voltage picked-off therefrom by the potentiometer 76.

FIG. 10 shows a similar circuit for a tool as shown in FIG. 10a. This is a drill having a diameter D and a bit 98 of the height SB. A centering drill 100 having a diameter D and a length 1 is provided on the bit 98 of the drill. The centering drill 100 has a bit 102 having a height SZB. The form of such a drill is to be taken into consideration with the circuit of FIG. 10. The output voltage of a potentiometer slider 116 is to give a measure for the matter drilled out down to smallest depths of the drill hole. For this purpose, three potentiometers 106, 108, 110 are provided. The three sliders 112, 114, 116 of the potentiometers are coupled with each other and with the tool advancement. A constant current flows through potentiometer 106. In accordance with the steps of the tool, taps 118, 120, 122 are provided, and resistors 124, 126, 128 are connected across the taps and the end of the potentiometer 106, respectively. The slider 112 of the potentiometer 106 is connected with a tap 130 of the potentiometer 108. This tap 130 lies, as does the tap 118 of potentiometer 106, on the level of the upper edge of the tip of the centering drill. The resistance of the potentiometer 108 is large as compared with that of the potentiometer 106. The resistance of the potentiometer 110 is again large as compared with that of the potentiometer 108.

The potentiometer 110 is interrupted on the level of the upper edge of the centering drill 100 and has taps 132 and 134 respectively there as well as on the level of the upper edge of the drill bit proper.

The tap 134 of the potentiometer 110 is connected with the tap 130 of the potentiometer 108, and the slider 112 of the potentiometer 106. The tap 132 of the potentiometer 110 is connected with the tap 120 of the potentiometer 106.

Within the range extending upwardly from the base to the taps 118 of the potentiometer 106, and 130 of the potentiometer 108 the same conditions are obtained as in FIG. 4. An additional voltage division is effected by the slider of the potentiometer 108, so that a quadratic characteristic of voltage versus depth of drill hole results. The slider 116 has the same potential as the slider 114.

Between the taps 120 and 122, and 132 and 134, respectively, thus in the range of the drill bit proper, again a voltage division is effected by the portion of potentiometer 110, so that the voltage picked off from 116 changes in accordance with a quadratic characteristic.

Above 122 and 134, the drill bit is again taken into consideration as a whole. The voltage picked off from 116 equals the voltage picked off at 112 and is connected in opposition to the measured voltage stored in 140 at a switch 138.

What I claim is:

1. In an apparatus for automatically correcting an unbalance in an object by obtaining a first voltage signal of a magnitude corresponding to the unbalance and then removing material from the object by a cutting tool, which tool does not remove material at a rate corresponding linearily with its depth of penetration throughout the full range of penetration, and which tool is connected to the slider of potentiometer means connected across a current source so that a second voltage can be picked off at the slider which second voltage is a function of the depth of penetration of the tool into the object and including a device to compare said voltages to determine when the tool has at least approximately penetrated to the desired depth, the improvement comprising: said potentiometer means having resistance characteristics which change with the amount of slider movement so that the amount of slider movement more correctly represents the amount of material removed by the tool, said resistance characteristics being adapted to the physical characteristics of the tool being employed.

2. In an apparatus as set forth in claim 1, wherein said slider has a first position which corresponds to the point at which the tool commences cutting and a second position which corresponds to the point at which the rate of material removal commences to be linear with the penetartion of the tool into the work, said means comprising a linear potentiometer and a resistor means shunt connected across said positions on the potentiometer.

3. In an apparatus as set forth in claim 2, wherein said resistor means may be selectively varied as to the amount of shunt resistance employed.

4. In an apparatus as set forth in claim 3, including means in series with said potentiometer and said current source to maintain the current through the unshunted portion of the potentiometer constant.

5. In an apparatus as set forth in claim 4, wherein said resistor means includes a plurality of resistors, each resistor shunting respective portions of the potentiometer between said positions.

6. In an apparatus as set forth in claim 5, wherein said potentiometer means includes a second linear potentiometer having a slider and a tap corresponding to the second position, said tape being connected to the slider of the first potentiometer, said slider of the second potentiometer being connected to said device.

7. In an apparatus as set forth in claim 2, wherein said potentiometer means includes a second linear potentiometer having a slider and a tap corresponding to the second position, said tap being connected to the slider of the first potentiometer, said slider of the second potentiometer being connected to said device.

8. In an apparatus as set forth in claim 7, wherein the resistance of the second potentiometer is large compared to that of the first potentiometer.

References Cited

UNITED STATES PATENTS 3,228,264  1/1966  Trimble.

FRANCIS S. HUSAR, *Primary Examiner.*

UNITED STATES PATENT OFFICE
CERTIFICATE OF CORRECTION

Patent No. 3,446,100　　　　　　　　　　　　　　May 27, 1969

Hans-Ludwig Munk

It is certified that error appears in the above identified patent and that said Letters Patent are hereby corrected as shown below:

Column 4, line 10, "$f_2$" should read -- $t_2$ --; line 32, "specified" should read -- specific --. Column 5, line 45, "As long" should read -- As long as --; line 57, after "voltage" cancel "$U_3$"; line 58, after "voltage", second occurrence, insert -- $U_3$ --. Column 6, line 46, "one" should read -- on --; line 73, "$Z_s$" should read -- ZS --. Column 8, lines 61 and 62, "penetartion" should read -- penetration --.

Signed and sealed this 5th day of May 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents